United States Patent [19]

Sychra

[11] Patent Number: 5,731,761
[45] Date of Patent: Mar. 24, 1998

[54] INCLINATION SENSOR

[75] Inventor: Robert R. Sychra, Washington, Ill.

[73] Assignee: Caterpillar Inc., Peoria, Ill.

[21] Appl. No.: 760,885

[22] Filed: Dec. 6, 1996

[51] Int. Cl.[6] .............................. G01C 9/06; G08B 21/00
[52] U.S. Cl. .............................. 340/689; 33/366; 33/377; 340/501; 364/559
[58] Field of Search .................... 340/689, 501; 33/366, 377; 364/559

[56] References Cited

U.S. PATENT DOCUMENTS

| | | | |
|---|---|---|---|
| 4,503,622 | 3/1985 | Swartz et al. | 33/366 |
| 5,548,273 | 8/1996 | Nicol et al. | 340/439 |
| 5,592,745 | 1/1997 | Heger et al. | 340/689 |
| 5,612,679 | 3/1997 | Burgess | 340/689 |

OTHER PUBLICATIONS

"±1g to ±5g Single Chip Accelerometer with Signal Conditioning", ADXL05, Analog Devices, pp. 1–19.
"Compensating for the 0 g Offset Drift of the ADXL50 Accelerometer", Kitchin et al., Analog Devices, Application Note AN-380.
"LVDT-to-Digital Converter", AD2S93, Analog Devices, pp. 16-37 to 16-45.
"Measuring Roller Coaster g-Forces with a Monolithic Accelerometer", Sensors, Nov. 1995, pp. 37–38.
"Redesigned Surface–Micromachined Accelerometer IC Provides Increased Sensitivity of ±1–5G Full Scale", Technology Advances, pp. 37,40.
"Using Accelerometers in Low g Applications", Charles Kitchin, Analog Devices, Application Note AN-374.
Miniature Crystal Oven, M05 Series & Miniature Oven, M18 Series, Isotemp Research, Inc. Specification Sheet.

Primary Examiner—Glen Swann
Attorney, Agent, or Firm—David M. Masterson

[57] ABSTRACT

An inclination sensor is disclosed. The sensor includes two temperature controlled inclination devices that are mounted orthogonal to each other. The inclination devices include an oven, a resistive element attached to the oven, an inclination transducer mounted in the oven and a thermistor being mounted to the oven. The thermistor produces a signal representative of the actual temperature of the oven. A microprocessor receives the actual temperature signal of each inclination device and produce heating signals to energize the corresponding resistive elements to control the temperature of the respective ovens to a desired temperature.

11 Claims, 4 Drawing Sheets

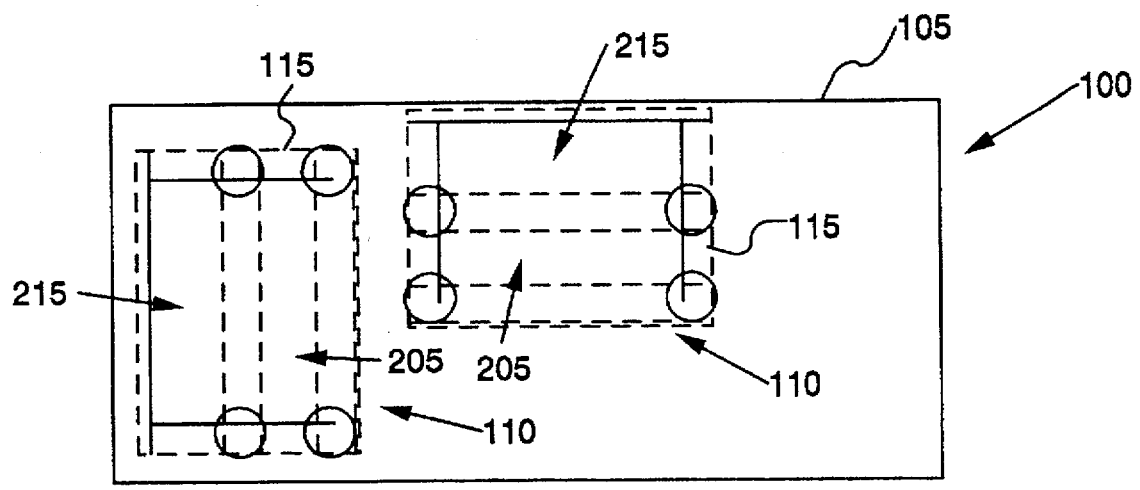
Fig_1_
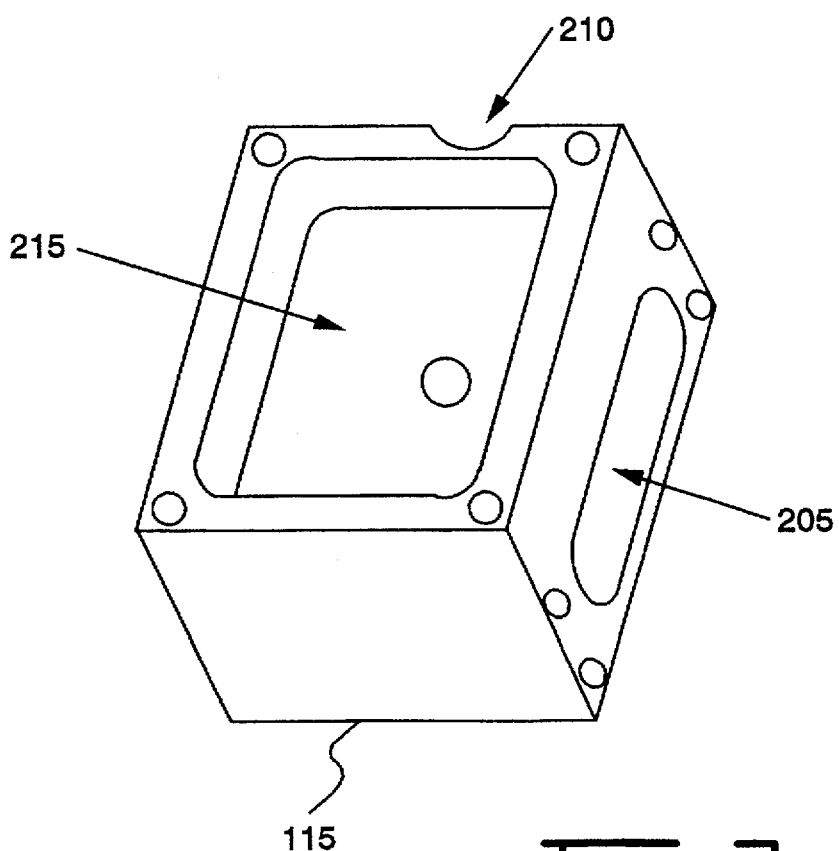
Fig_2_

INCLINATION SENSOR

TECHNICAL FIELD

This invention relates generally to an inclination sensor and, more particularly, to an inclination sensor that provides for accurate sensing readings over a large range of ambient temperature.

BACKGROUND ART

Inclination transducers provide a signal that varies as the transducer is rotated about an axis relative to the earth's gravity. An inclination transducer can be used to determine the roll or pitch of a machine.

One problem associated with an inclination transducer is that the transducer output tends to drift with temperature. For example, one common structure of an inclination transducer includes a hermetically sealed glass bulb that contains three parallel, coplanar electrodes immersed in an electrolyte. As the transducer tilts, the electrolyte redistributes, submerging one of the outer electrodes more and the other less. Because the electrodes form the legs of a Wheatstone bridge, changes in resistance caused by the redistribution of the electrolyte are measured. However, as the temperature of the electrolyte changes, the property of the electrolyte changes causing a change in resistance. This change in the electrolyte property creates the thermal drift problem.

The present invention is directed toward overcoming one or more of the problems as set forth above.

DISCLOSURE OF THE INVENTION

In one aspect of the present invention, an inclination sensor is disclosed. The sensor includes two temperature controlled inclination devices that are mounted orthogonal to each other. The inclination devices include an oven, a resistive element attached to the oven, an inclination transducer mounted in the oven and a thermistor being mounted to the oven. The thermistor produces a signal representative of the actual temperature of the oven. A microprocessor receives the actual temperature signal of each inclination device and produce heating signals to energize the corresponding resistive elements to control the temperature of the respective ovens to a desired temperature.

BRIEF DESCRIPTION OF THE DRAWINGS

For a better understanding of the present invention, reference may be made to the accompanying drawings in which:

FIG. 1 illustrates an overhead, cutout view of an inclination sensor having two inclination transducers mounted orthogonally to one another;

FIG. 2 illustrates an oven that holds an inclination transducer and associated electronic circuitry;

BEST MODE FOR CARRYING OUT THE INVENTION

Figure 3:
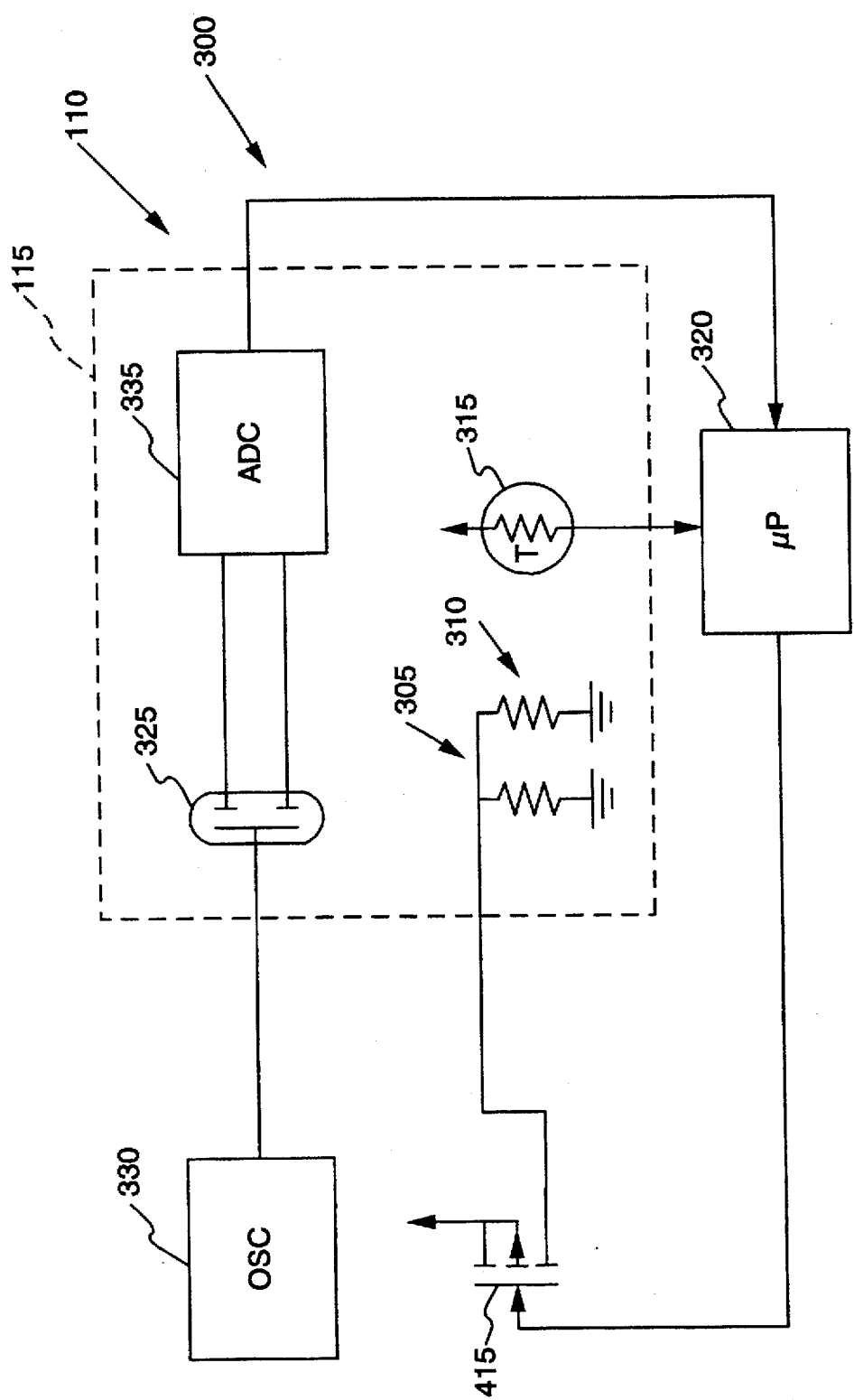
FIG. 3 illustrates the electronic circuitry associated with an inclination transducer.

The present invention pertains to an inclination sensor that is capable of determining the pitch and roll of a machine or machine implement. Advantageously, the present invention utilizes a temperature controlled oven assembly which maintains the accuracy of the inclination sensor over a large range of ambient temperatures.

Reference is now made to FIG. 1 which shows an overhead, cutout view of the inclination sensor 100. The inclination sensor 100 includes two temperature controlled inclination devices 115 that are contained in a housing 105. Preferably, the inclination devices 115 are mounted orthogonal to each other in a horizontal plane of the housing 105 to detect the inclination or tilt in two axis of orientation. For example, one inclination device 115 is capable of detecting the pitch of a machine, while the other inclination device 115 detects the roll of the machine. Although not apparent by the drawing, the housing 105 fully encloses the inclination devices 110 to provide them with protection.

The inclination devices 110 include an oven 115, which is machined from a block of aluminum. The oven 115 is shown with more particularity in FIG. 2. The oven includes a large cavity 205 that holds a inclination transducer and a small cavity 210 that holds a thermistor. The oven 115 additionally includes a recessed cavity 215 at a side of the oven 115 for holding a rectangular printed circuit board that includes analog circuitry associated with the transducer.

Reference is now made to FIG. 3 which shows the temperature control circuitry 300 associated with each inclination device 110. A resistive element 305 is attached to the oven 110 to provide heating energy thereto. The resistive element 305 includes two power resisters 310 that heat the oven with the associated heating energy. A thermistor 315 that is mounted to the oven produces a signal representative of the actual temperature of the oven. More particularly, as the oven temperature changes, the resistance of the thermistor 315 changes accordingly. Consequently, the voltage drop across the thermistor 315 results in a signal whose magnitude is representative of temperature. A first microprocessor 320 receives the actual temperature signal produced by the thermistor 315 and produces a heating signal to energize the power resistors 310 in order to control the temperature of the oven 115 to a desired temperature. Although a microprocessor is described, it is apparent to those skilled on the art that the function of the microprocessor may be equally performed by discrete analog circuitry or application specific digital circuitry.

Figure 4:
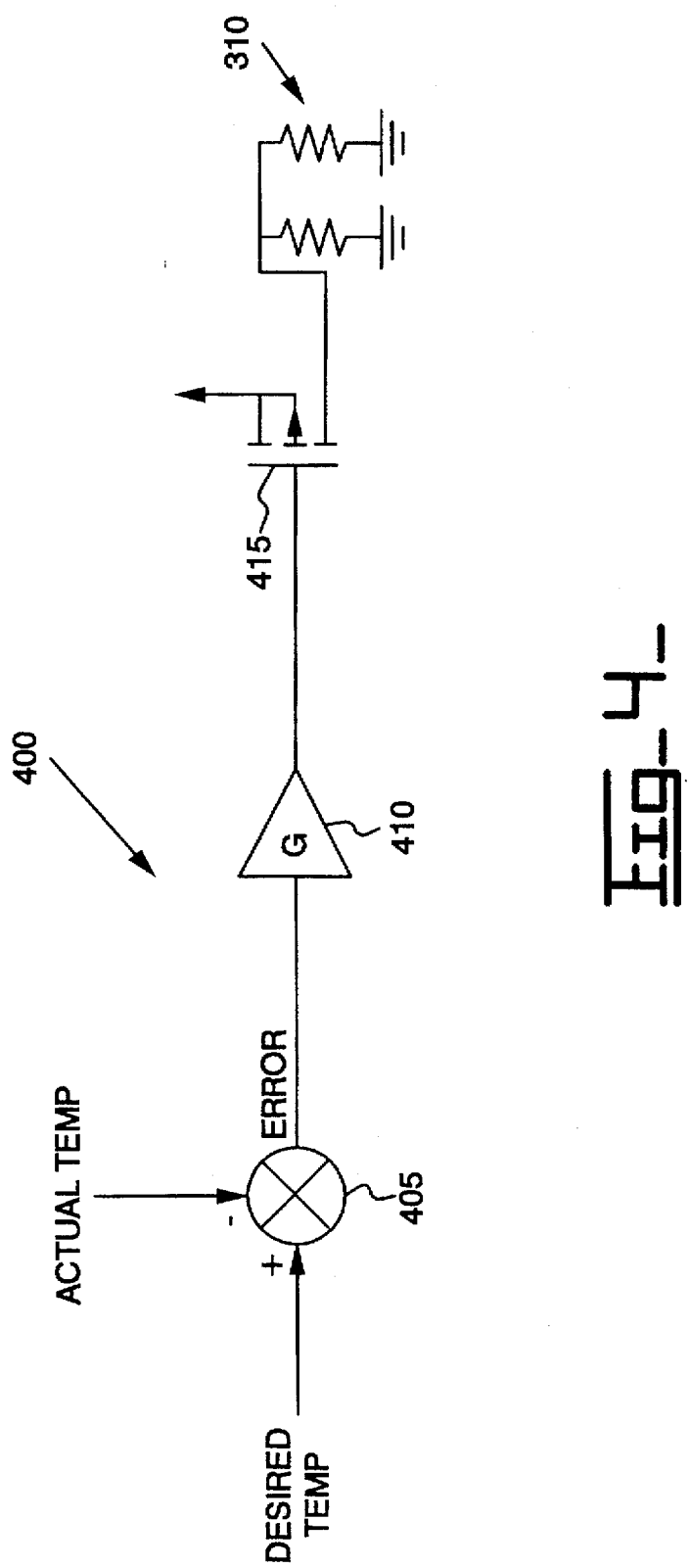
FIG. 4 illustrates a control scheme that regulates the oven temperature.

The control strategy 400 for the temperature control of the first microprocessor 320 is shown with respect to FIG. 4. Preferably, the control strategy 400 is implemented in software of the first microprocessor 320 as a proportional gain feedback control. The first microprocessor 320 determines a desired temperature of the oven 115 and produces a signal representative thereof. The desired temperature signal magnitude is then compared to the actual temperature signal magnitude at a summing junction 405, which produces an error signal indicative of the difference between the signal magnitudes. The error signal is multiplied by a gain value from a gain stage 410 to produce the heating signal. Preferably, the first microprocessor 320 produces the heating signal with a pulse width modulation form. A transistor 415 that is connected to the first microprocessor 320 receives the heating signal and energizes the resistors 320 in response to the conduction pulse width of the heating signal.

Adverting back to FIG. 3, the sensing portion of the inclination sensor will now be described. An oscillator 330 produces a signal that energizes a corresponding inclination transducer 325. Preferably, the oscillator 330 energizes the inclination transducer 325 with a sinusoidal signal. As shown, the inclination transducer 325 is a three terminal device having one input terminal driven by the sinusoidal signal and the other two terminals providing output signals whose magnitude changes differentially with the inclination of the transducer. The inclination transducer 325 may include a fluid type device that contains an electrolytic solution similar to that manufactured by The Fredericks Company as Series 0728. However, it will be apparent to those skilled in the art that the inclination transducer may equally include an accelerometer similar to that manufactured by Analog Devices as model ADXL05.

Advantageously, an analog to digital converter 335 is mounted in the oven 115 and is connected to the output terminals of the inclination transducer 325. The analog to digital converter 335 is adapted to measure the difference between the output signal magnitudes of the inclination transducer 325 and produce digital signals representative of the inclination of the transducer 325. Because the analog to digital converter 335 is mounted in the oven, the converter 335 produces digital signals of a high degree of accuracy independent of the fluctuation of the ambient temperature.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The operation of the present invention is now described to illustrate the features and advantages associated with the present invention. As stated above, the present invention pertains to an inclination sensor that is capable of determining the pitch and roll of a machine or machine implement. For example, the present invention is applicable to detecting the pitch and roll of paving machines such as an asphalt paver or cold planer. Moreover, the present invention is applicable to detecting the pitch and roll of a blade of a motor grader or bulldozer. Advantageously, the present invention utilizes a temperature controlled oven assembly which maintains the accuracy of the inclination sensor over a large range of ambient temperature.

Figure 5:
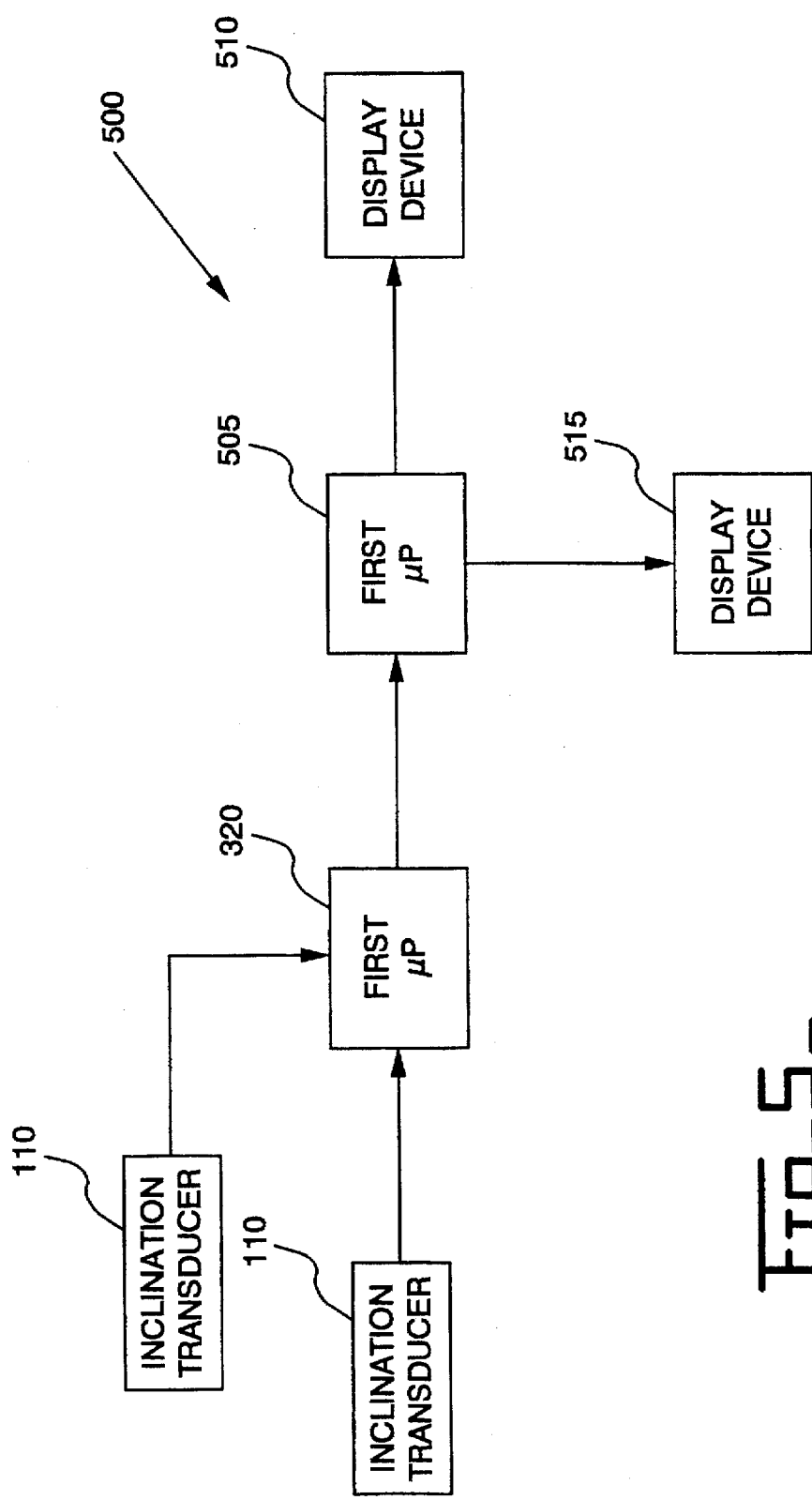
FIG. 5 illustrates an inclination control system utilizing the temperature sensor associated with the present invention.

Reference is now made to FIG. 5 which shows an inclination control system 500. The first microprocessor 320 receives digital signals from the inclination transducers 110 and responsively produces a slope signal and a pitch signal. Preferably, the slope and pitch signals are produced in a pulse width modulation form. A second microprocessor 505 receives the slope and pitch signals, determines the duration of the conduction pulse of the received signals, and determines the actual slope and pitch of the measured device. The second microprocessor 505 produces respective display signals to a display device 510 which displays the slope and pitch of the measured device. The slope and pitch may be displayed graphically or numerically. Moreover, the second microprocessor 505 may produce a control signal to a control device 515 to change the slope and pitch of the measured device to a desired orientation.

Other aspects, objects and advantages of the present invention can be obtained from a study of the drawings, the disclosure and the appended claims.

I claim:

1. An inclination sensor, comprising:

two temperature controlled inclination devices being mounted orthogonal to each other in a horizontal plane, each inclination device, including:

an oven;

a resistive element being attached to the oven to provide heating energy thereto;

an inclination transducer being mounted in the oven; and a thermistor being mounted to the oven and adapted to produce a signal representative of the actual temperature of the oven; the inclination sensor further including:

a first microprocessor adapted to receive the actual temperature signal of each inclination device and produce heating signals to energize the corresponding resistive elements to control the temperature of the respective ovens to a desired temperature;

an oscillator being adapted to produce a signal to energize the inclination transducer; and wherein the first microprocessor receives signals from the energized inclination transducers that represent the inclination of the respective transducers.

2. An inclination sensor, as set forth in claim 1, wherein the first microprocessor determines a desired temperature of the oven and produces a signal representative thereof, compares the desired temperature signal magnitude to the actual temperature signal magnitude, and produces an error signal indicative of the difference between the desired and actual temperature signal magnitude.

3. An inclination sensor, as set forth in claim 2, wherein the first microprocessor multiplies the error signal by a gain value and responsively produces the heating signal with a pulse width modulation form.

4. An inclination sensor, as set forth in claim 3, including a transistor being connected to the first microprocessor and adapted to receive the heating signal and responsively energize the resistive element in response to the conduction pulse width of the heating signal.

5. An inclination sensor, as set forth in claim 1, wherein the inclination transducers each include a three terminal device having one input terminal driven with the oscillator signal and the other two terminals providing output signals whose magnitude changes differentially with the inclination of the transducer.

6. An inclination sensor, as set forth in claim 5, wherein each temperature controlled inclination device includes an analog to digital converter mounted in the oven and connected to the output terminals of a respective inclination transducer, the analog to digital converter being adapted to measure the difference between the output signal magnitudes of the respective inclination transducer and produce digital signals representative of the inclination of the transducer.

7. An inclination sensor, as set forth in claim 6, wherein the first microprocessor receives the digital signals from the analog to digital converter and produces a slope signal representative of the inclination of one of the transducers and a pitch signal representative of the inclination of the other transducer.

8. An inclination sensor, as set forth in claim 7, including a second microprocessor connected to the first microprocessor, the second microprocessor receives the slope and pitch signal, determines the inclination of the respective transducers, and produces respective display signals.

9. An inclination sensor, as set forth in claim 8, including a display device being connected to the second microprocessor, the display device receiving the display signals and displaying the slope and pitch of the inclination sensor.

10. An inclination sensor, as set forth in claim 9, wherein the resistive element includes two power resisters that heat the oven.

11. An inclination sensor, as set forth in claim 10, wherein the inclination transducer is a fluid type device containing an electrolytic solution.

* * * * *